US 6,701,085 B1

(12) United States Patent
Müller

(10) Patent No.: US 6,701,085 B1
(45) Date of Patent: Mar. 2, 2004

(54) METHOD AND APPARATUS FOR DATA TRANSMISSION IN THE WAVELENGTH-DIVISION MULTIPLEX METHOD IN AN OPTICAL RING NETWORK

(75) Inventor: Horst Müller, Hohenschäftlarn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,528
(22) PCT Filed: Jun. 10, 1998
(86) PCT No.: PCT/DE98/01577
§ 371 (c)(1),
(2), (4) Date: Jan. 23, 2000
(87) PCT Pub. No.: WO99/05811
PCT Pub. Date: Feb. 4, 1999

(30) Foreign Application Priority Data

Jul. 22, 1997 (DE) .......................... 197 31 494

(51) Int. Cl.[7] ............................................. H04B 10/00
(52) U.S. Cl. ..................................... 398/4; 398/3
(58) Field of Search ................. 359/119, 124, 359/110; 398/2, 3, 4, 5

(56) References Cited

U.S. PATENT DOCUMENTS

| 5,442,623 A | 8/1995 | Wu | |
| 5,717,796 A | 2/1998 | Clendening | 385/24 |
| 5,731,887 A * | 3/1998 | Fee | 359/110 |
| 5,760,934 A * | 6/1998 | Sutter et al. | 359/119 |

FOREIGN PATENT DOCUMENTS

| DE | 43 37 089 A1 | 5/1995 |
| EP | 0 651 528 | 5/1995 |
| EP | 0 651 528 A1 | 5/1995 |
| EP | 0 716 521 | 6/1996 |
| EP | 0 876 018 A2 | 11/1998 |
| JP | 08-018592 | 1/1996 |

OTHER PUBLICATIONS

A. Hamel et al., "First results of an experimental Coloured Section Ring", 22nd European Conference on Optical Communication, Oslo, (1996), pp. 3.51–3.54.
A. F. Elrefaie, "Multiwavelength Survivable Ring Network Architectures", IEEE (1993), pp. 1245–1251.
Juergen Heiles, Siemens AG (1996), Bi–directional self healing ring protection for optical networks, pp. 1–5.
R. Cadeddu et al., An Optical Bidirectional Self–Healing Ring With Increased Capacity Using WDM, CSELT, Italy, pp. 4–28.

* cited by examiner

Primary Examiner—Jason Chan
Assistant Examiner—Christina Y Leung
(74) Attorney, Agent, or Firm—Bell, Boyd & Lloyd LLC

(57) ABSTRACT

Method for data transmission in a bi-directional working channel between a plurality of terminals of an optical ring network having a protection means that, given a disturbed data transmission, sets up a protection connection in the wavelength-division multiplex method in a working channel via the undisturbed section of the ring network in a single bi-directional protection channel that has at least the transmission capacity of the working channel.

15 Claims, 5 Drawing Sheets

METHOD AND APPARATUS FOR DATA TRANSMISSION IN THE WAVELENGTH-DIVISION MULTIPLEX METHOD IN AN OPTICAL RING NETWORK

This application is a 371 of PCT/DE98/01577, filed Jun. 10, 1998.

BACKGROUND OF THE INVENTION

Field of the Invention

Optimally cost-beneficial and dependable transmission systems are desirable for the transmission of digital signals. Ring structures are preferably employed for the connection of the individual network elements (network nodes/terminals, terminal multiplexers, add/drop multiplexers) since this structure makes it possible to conduct "working signals" and "protection signals" on separate paths (i.e., to respectively connect two network elements to one another via the shortest ring section with working channels, as a rule, and to connect them to one another via the longer ring section with protection channels, at least in the case of malfunctions). The protection connection is automatically produced given line interruptions, so that only brief disturbances occur.

Given higher data rates, as employed in the synchronous digital hierarchy (SDH) or the synchronous optical network (SONET), optical fibers are utilized because of the greater transmission bandwidth and their lower attenuation. The wavelength-division multiplex method is often employed in order to optimally utilize the optical fibers. Patent applications DE 43 37 089 A1, EP 651 529 A1 and EP 0651 528 A1 disclose optical ring networks wherein different wavelengths are employed for the connections of network elements in a ring.

The contribution, "First results of an experimental Coloured Section Ring", in the 22nd European Conference on Optical Communication—ECOC'96, Oslo, WeB.2.3, page 3.51 through page 3.54, describes a ring structure shown in FIG. 1, whereby neighboring add/drop multiplexers are connected to one another via two respective waveguides. Only one wavelength is used for both transmission directions between two neighboring add/drop multiplexers However different wavelengths are used on all transmission sections. The output and input of signals ensues via optical add/drop multiplexers, that correspond to optical filters. When the working channel that usually uses the shortest ring section is disturbed, a protection connection is set up via the longer ring section using the same wavelength (i.e., the working signal previously sent via the disturbed section is "looped back"). Just as many protection channels as working channels with a corresponding bandwidth are required in this method. A method based on this principle is disclosed in the earlier application DE 19 707 056 A1.

SUMMARY OF THE INVENTION

An object of the invention is to optimally utilize the transmission capacity of a ring network equipped with a protection means.

According to one aspect of the invention, a method is provided for transmitting data in a bi-directional working channel between a plurality of terminals of a optical ring network that affords a protection connection. This connection is established when a disturbance of data transmission occurs via the undisturbed section of the optical ring network by utilization of a wavelength-division multiplex method executed in the working channel, wherein a single bi-directional protection channel is comprised of a predetermined wavelength range in at least a transmission capacity of the working channel for connecting all of the plurality of terminals to one another. The method includes detecting whether at least one of a disturbance of a line section between two neighboring terminals for a malfunction of a working line/trunk assembly of the two neighboring terminals has occurred. A protection connection is then established in the bi-directional protection channel between the two neighboring terminals via protection line/trunk modules and the undisturbed sections of the optical ring network when either of the disturbance or malfunction conditions has occurred. Hence, a protection channel is established that loops through the unaffected terminals of the plurality of terminals.

According to another aspect of the invention, an apparatus is provided for transmitting data between a plurality of terminals in an optical ring network that provides protection when data transmission is disturbed through enabling a protection connection using wavelength division multiplexing in a protection channel via undisturbed sections of the optical ring network. The apparatus includes a plurality of wavelength-division multiplexers and demultiplexers for decoupling and coupling individual working and protection signals, respectively. A single bi-directional channel is comprised of predetermined wavelength range and at least the transmission capacity of the working channels to connect all of the plurality of terminals to one another. Also, corresponding working and protection line/trunk modules for each transmission direction are provided in each of the network terminals. Further, a plurality of optical switches are disposed between the outputs of the wavelength-division demultiplexers and inputs of the wavelength-division multiplexers and are configured to loop the protection channel through the plurality of terminals when there are no disturbed connections and, alternatively, for switching onto an allocated protection module and producing a protection connection with the bi-directional protection channel via undisturbed sections of the optical ring network when a disturbance has occurred.

Only one protection channel to which all terminals have access (ie., can send and receive data) is provided in the invention. In the undisturbed case, the channel is through-connected from all terminals, whereas, in case of malfunction, a connection is set up between the affected channels via the undisturbed, longer ring section. Like the working channel, the protection channel can also comprise a plurality of sub-channels with a plurality of wavelengths that set up connections to different terminals. In the protection case, connections are then set up with different wavelengths via the allocated sub-channels.

The dependability of a ring network is increased in that separate working and protection line/trunk modules are provided. The working signals and the protection signals are simultaneously checked in order to prevent unnecessary switching given protection connections,that are likewise disturbed.

Good dependability with low outlay is achieved when a faulty transmission channel caused, for example, by a channel break and a faulty line/trunk module are treated the same. In both instances, a switch is simultaneously made onto the protection line/trunk module and the protection connection.

Enhanced security is achieved by employing an additional switching module that, given a malfunctioning working line/trunk module, switches onto the corresponding protecting line/trunk module without a simultaneous switch onto the protection connections. Thus protection channel is available for the protection connection in line transmissions despite malfunctioning line/trunk modules.

The operating dependability can be further increased doubling the terminal equipment (multiplexers and line/trunk modules) and by a corresponding switching means.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference designations represent like elements throughout and wherein.

DETAILED DESCRIPTION OF THE PREFERRED EMBODIMENTS

Figure 1:
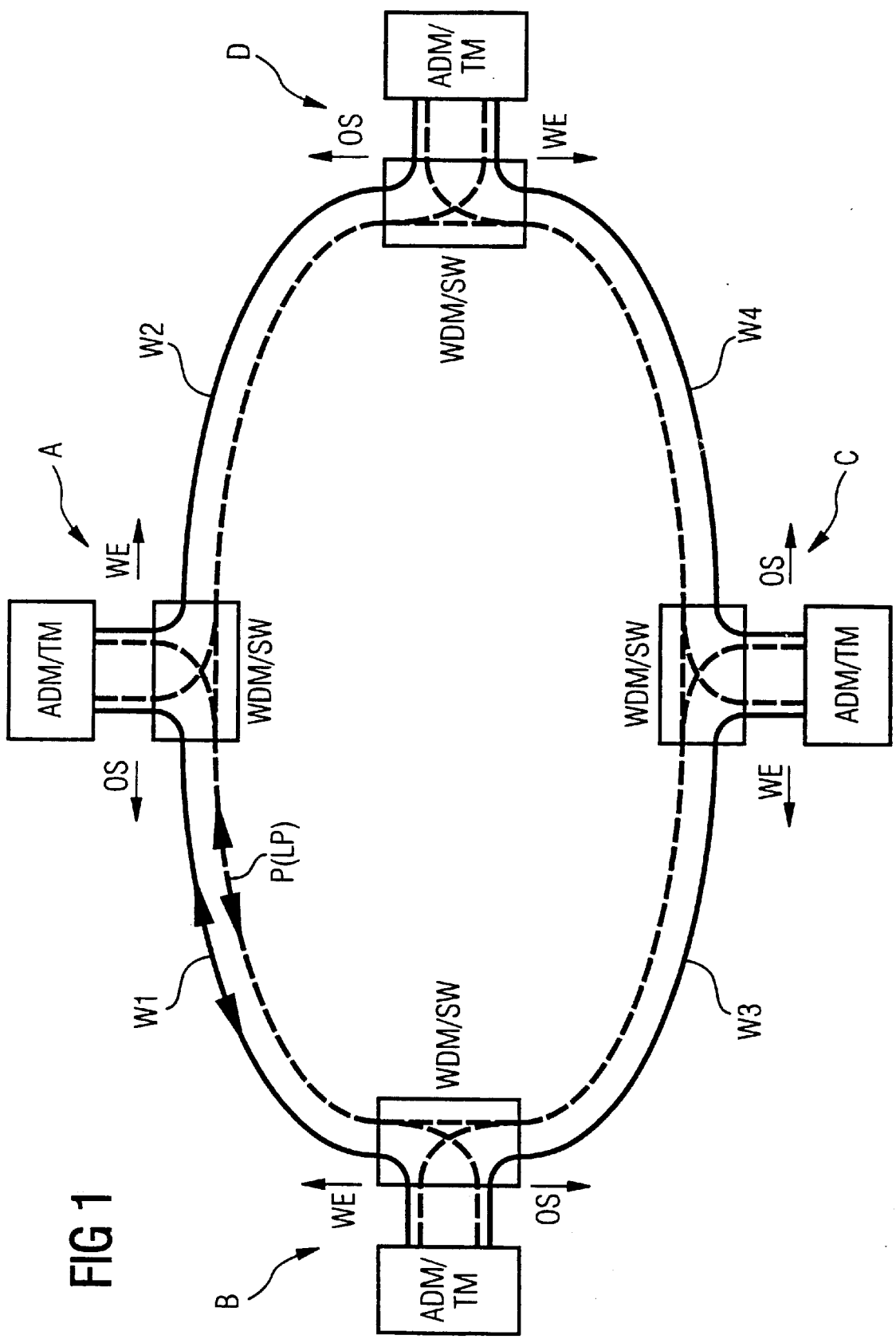
FIG. 1 illustrates a ring network with protection according to the invention.

FIG. 1 shows a ring network. Four terminals (network nodes) A, B, C, D are connected to one another via a wavelength-division multiplex switch means WDM/SW that belongs to the protection means and contains optical wavelength-division multiplexers (WDM) and optical switches SW as well as monitoring and control means. The network nodes can comprise add/drop multiplexers ADM and/or terminal multiplexers TM. The network nodes are connected to one another via specific working channels W1, W2 etc., to which a specific wavelength range LW or a plurality of individual channels with a plurality of wavelength ranges are allocated.

In the example, terminal A is connected to the terminal B via the working channel W1 and is connected to the terminal D via the working channel W2. Since a maximum transmission rate is generally possible in the entire ring network, one also speaks of only one working channel W that generally transmits over the individual sections of the ring network, but different information with data rates that are often different. Likewise, the same wavelengths can also be employed on different sections.

The working channel W1 comprises, for example, a wavelength range LW (corresponding to the data rate to be transmitted and the modulation method employed) that, for example, comprises two individual channels with the wavelengths $\lambda 1$, $\lambda 2$. The individual channel with the wavelength $\lambda 1$ connects the terminal A to the terminal B, and a further individual channel, which comprises the wavelength $\lambda 2$, connects the terminal A to the terminal C (in conformity with the plurality of add/drop multiplexers and terminal multiplexers connected to one another, two terminals can also be connected to one another by groups of individual channels). The data transmission between terminal B and terminal C can ensue with a further wavelength or with the wavelength $\lambda 1$.

Correspondingly, a single protection channel P usable by all terminals is provided for all terminals. This protection channel P comprises a transmission capacity that corresponds to the maximum used transmission capacity on a section of the ring. The protection channel and the working channel are transmitted via the same lines(i.e., the fibers F1 and F2), in the wavelength-division multiplex method, i.e. the wavelength range LP (or the wavelengths) employed in the protection channel does not overlap with any wavelength employed in the ring network.

FIG. 1 assumes a two-fiber ring wherein the transmission ensues with the same wavelength in both directions. However, a single-fiber network can be employed, wherein different wavelengths are allocated to the transmission directions and, thus, twice the transmission bandwidth is required for the forward and return direction. The protection channel respectively uses the same fibers or, respectively, the same fiber but in a different wavelength range.

Figure 2:
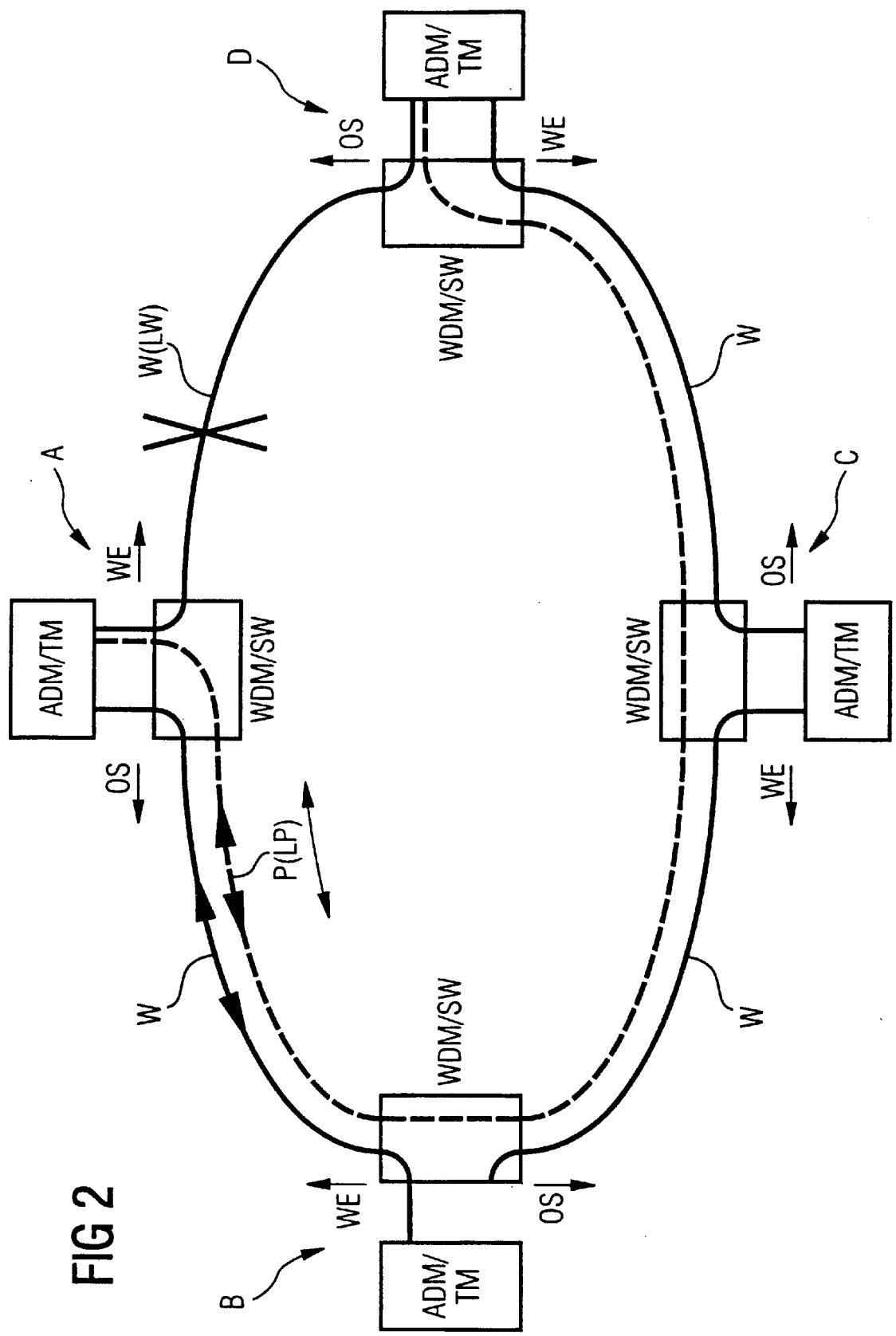
FIG. 2 illustrates a malfunction in this ring network.

It was assumed in FIG. 2 that the connection between the terminal (network node) A and the terminal (network node) D is disturbed. The data exchange between the affected terminals now ensues via the protection channel P with the wavelength LP via the long, undisturbed path. The non-participating stations B and C loop the protection channel through with the assistance of the wavelength-division multiplexer switch means WDM/SW.

Figure 3:
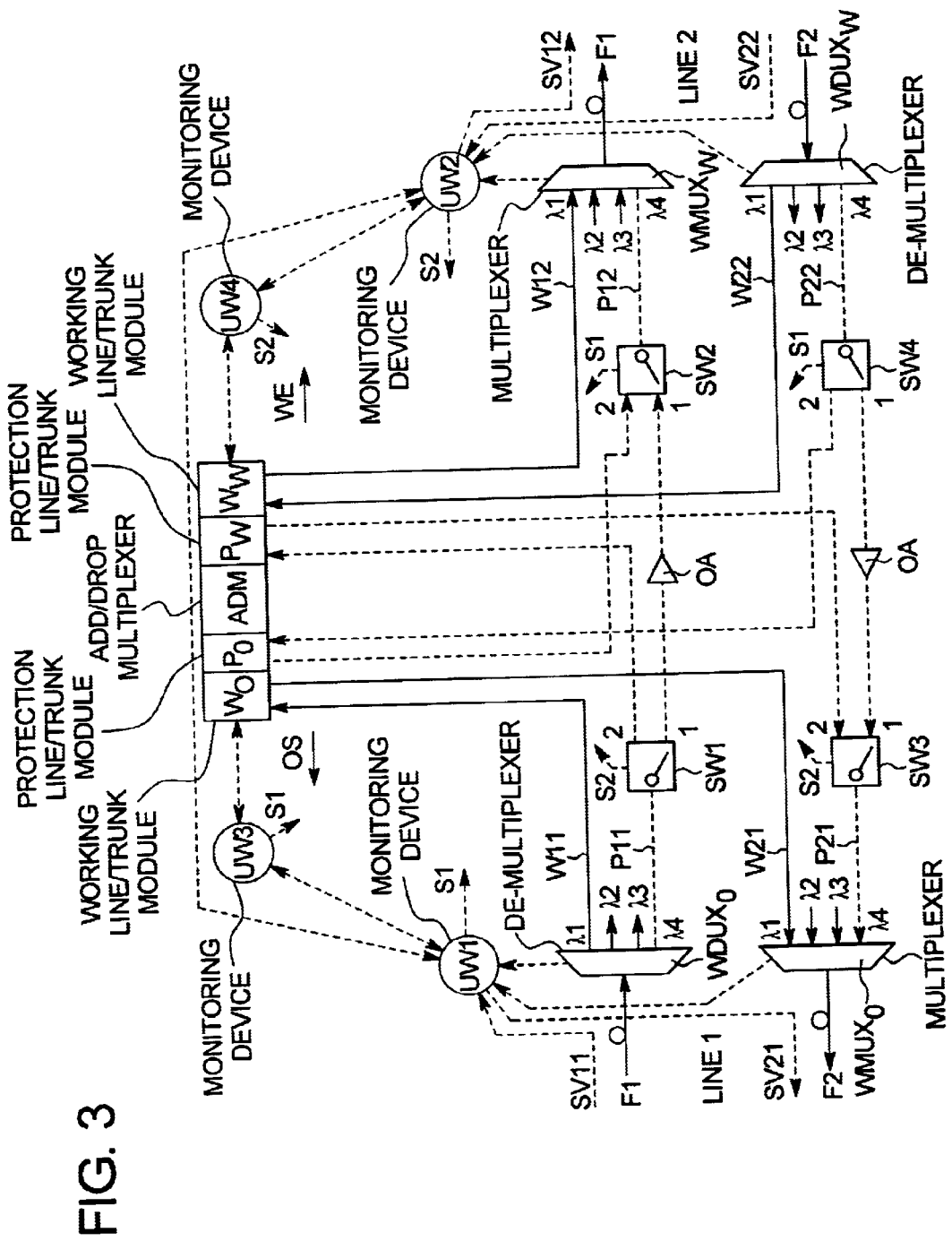
FIG. 3 illustrates a protection means.

FIG. 3 shows the wavelength-division multiplexer switch means WDM/SW of the protection means of a terminal (e.g., A) in detail. The bi-directional working channels are divided into working transmission channels W12 and W21 and working reception channels W11 and W22 and are shown with solid lines; the corresponding protection channels P21, P12; P22, P11, in contrast, are shown with broken lines. A terminal with an add/drop multiplexer ADM is shown, as an example, comprising a working line/trunk module $W_O$, $W_W$ and a protection line/trunk module $P_O$, $P_W$ in each transmission direction OS (east) and WE (west) (a terminal multiplexer that is only suitable for point-to-point connections, of course, would comprise only one working and protection line/trunk module).

A network node can also comprise a plurality of add/drop and terminal multiplexers. Corresponding line/trunk modules would then receive and transmit a corresponding plurality of input and output signals that exhibit different wavelengths.

In the circuit diagram (shown simplified), connections are only maintained to the directly neighboring the terminals. From the terminal neighboring at the east, working signals are received via a first fiber F1 of the connection LINE1 in a working reception channel W11, which is part of the bi-directional working channel W, and are forwarded to the working line/trunk module $W_O$ via a wavelength-division demultiplexer $WDUX_O$. A working signal is transmitted from this line/trunk module to the network node neighboring on the east, being transmitted via a wavelength-division multiplexer $WMUX_O$ over a second fiber F2 in a working transmission channel W21, which forms the working channel W together with the working reception channel.

The data exchange with the terminal neighboring at the west ensues in the same way via the connection LINE2 and fiber F1 by which, however, transmission is now carried out, and via fiber F2, by which reception now ensues. The working signals sent and received by the line/trunk modules are again conducted via a wavelength-division multiplexer $WDUX_W$ and a wavelength-division demultiplexer $WDUX_W$.

Since the working signals are permanently allocated to the working channels, the same reference characters are employed for them.

Monitoring devices UW1 and UW2 for the respective east and west direction are allocated to the wavelength-division multiplexers and the wavelength-division demultiplexers; further monitoring devices UW3 and UW 4 are allocated to the add/drop multiplexers ADM (a terminal multiplexer would manage with fewer monitoring functions).

When only one transmission working channel and one reception channel are respectively present in east and west traffic directions, four switches SW1 through SW4 suffice in order to loop either the protection signal or, the protection channel through an optical amplifier an for potential amplifier OA for potential amplification or to supply it to a protection line/trunk module or to insert a protection transmission signal instead of the working transmission signal.

When, in contrast, a terminal comprises a plurality of add/drop multiplexers or terminal multiplexers with a corresponding plurality of line/trunk modules (i.e., inputs and outputs), that are connected via individual working channels with different wavelengths, then the plurality of switch groups must be correspondingly multiplied.

In FIG. 3, two individual working channels are referenced specifying two wavelengths $\lambda 1$, $\lambda 2$ and the two sole individual protection channels employed in the overall ring network are referenced with $\lambda 3$, $\lambda 4$ that are coupled out or merged wavelength-individually by the wavelength-division demultiplexers.

When terminals that are not directly adjacent to one another are also connected by the individual working channels, then the corresponding connections in case of malfunction must be set up via the individual protection channels. These terminals affected by a malfunction are likewise considered to be "neighboring terminals".

The states of the switches are shown for the malfunction-free case. Given an interruption of the fibers F1, F2 of the connection LINE 2 in the western direction (FIG. 2), the terminals A and D receive no data. As a result thereof, switching to protection mode is triggered. To this end, control signals S1 and S2 actuate the switches S1 and S3 in order to now send the data from the protection line/trunk group $P_W$ via the switch SW3 in the protection channel P21 in the eastern direction OS and to receive data from the eastern direction OS in the protection channel P11 and supply them to the protection line/trunk module $P_W$.

The switch to protection mode can be controlled via service channels SV11, SV21 and SV12, SV22. Via these service channels the other network nodes can be prevented from undertaking further, inadmissible switching events as well.

Given an outage of a working line/trunk module at the monitoring likewise initiates a switching to the protection connection and an actuation of the switches SW1 and SW3. The monitoring devices through UW4, which are actually function blocks of a monitoring unit, correspond with one another and can control the switching events via the service channels. The switching event in the neighboring terminal, however, can also be triggered by the absence of reception data.

The method allows a simultaneous outage of a plurality of working line/trunk modules in different multiplexers in the same terminal. Since, however, the same switching ensues given a malfunction of a line/trunk module and of a connection, an alternate routing given a failure of line/trunk modules in different terminals is only possible when the multiplexers work with different wavelengths.

Figure 4:
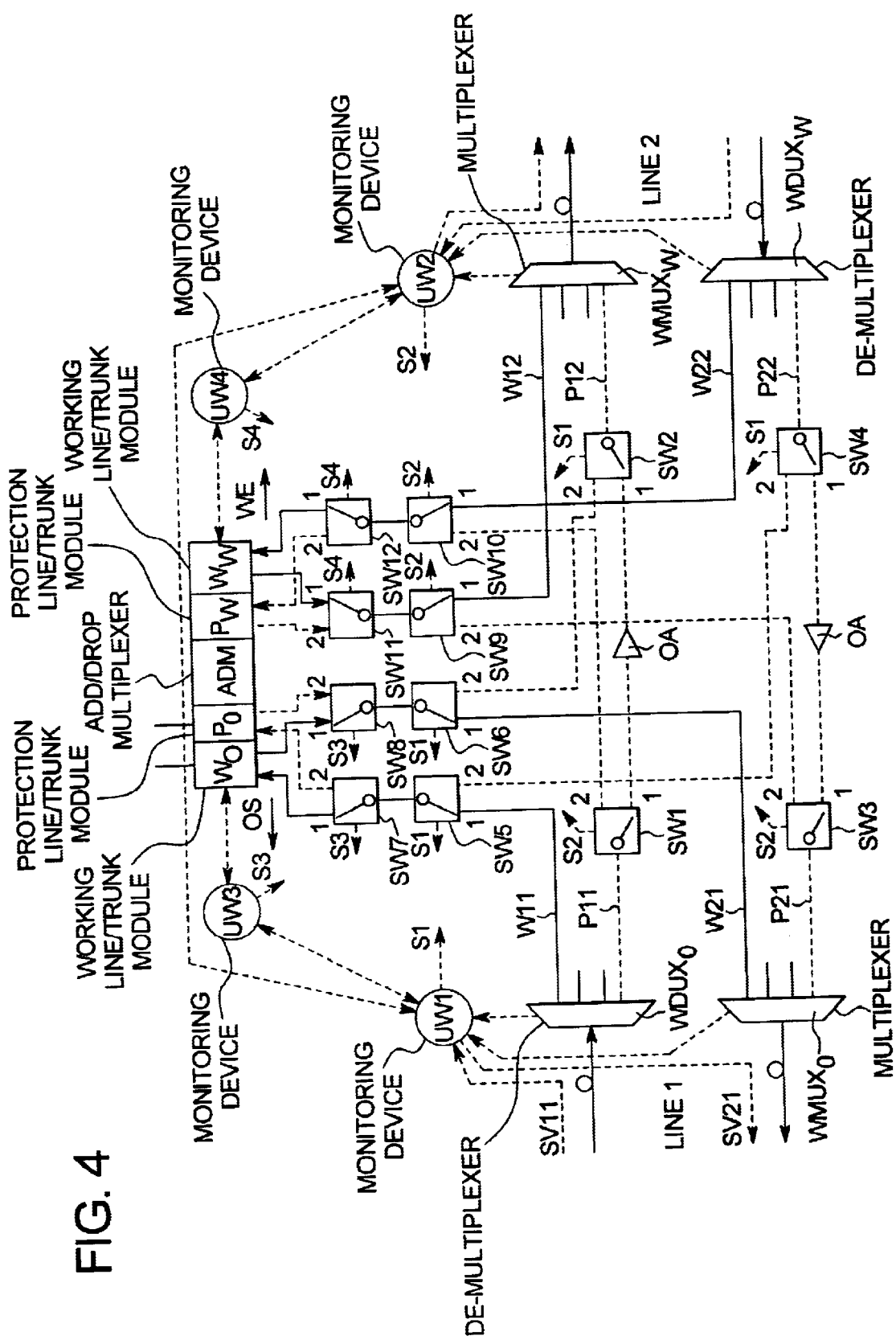
FIG. 4 illustrates a protection means with additional line/trunk module protection.

A preferred version of the method is explained on the basis of FIG. 4. The schematic circuit diagram shown in FIG. 4 contains additional switching units SW5 through SW8, and SW9 through SW12 that respectively allows a section to be made for each connection direction (LINE1 or LINE2) between both the working reception channel and the protection reception channel or the working transmission channel and the protection transmission channel, as well as to connect the selected channel to the working line/trunk module or to the protection line/trunk module. Each switch field is composed of four switch (i.e., SW5 through SW8 or SW9 through SW12). Respectively two switches are connected in series, whereby the switchover contacts are connected to one another (a parallel circuit of the switches is also possible).

Given an outage of the working line/trunk module $W_W$, the monitoring device UW4 ;via its control signal S4, causes the switches SW11 and SW12 to switch into their position 2 (shown with broken lines) wherein the working transmission channel W12 and the working reception channel W22 are now connected as an alternative to the corresponding protection line/trunk module $P_W$. The sequencing of the data exchange thus continues to ensue via the same fibers. In this case, no error message need ensue to the neighboring network node or the message continues to be sent that no protection switching is to be implemented. Further outages of the line/trunk modules in other terminals therefore, also do not create disturbances.

The same switching as previously described on the basis of FIG. 3 ensues given an (additional) line interruption.

Figure 5:
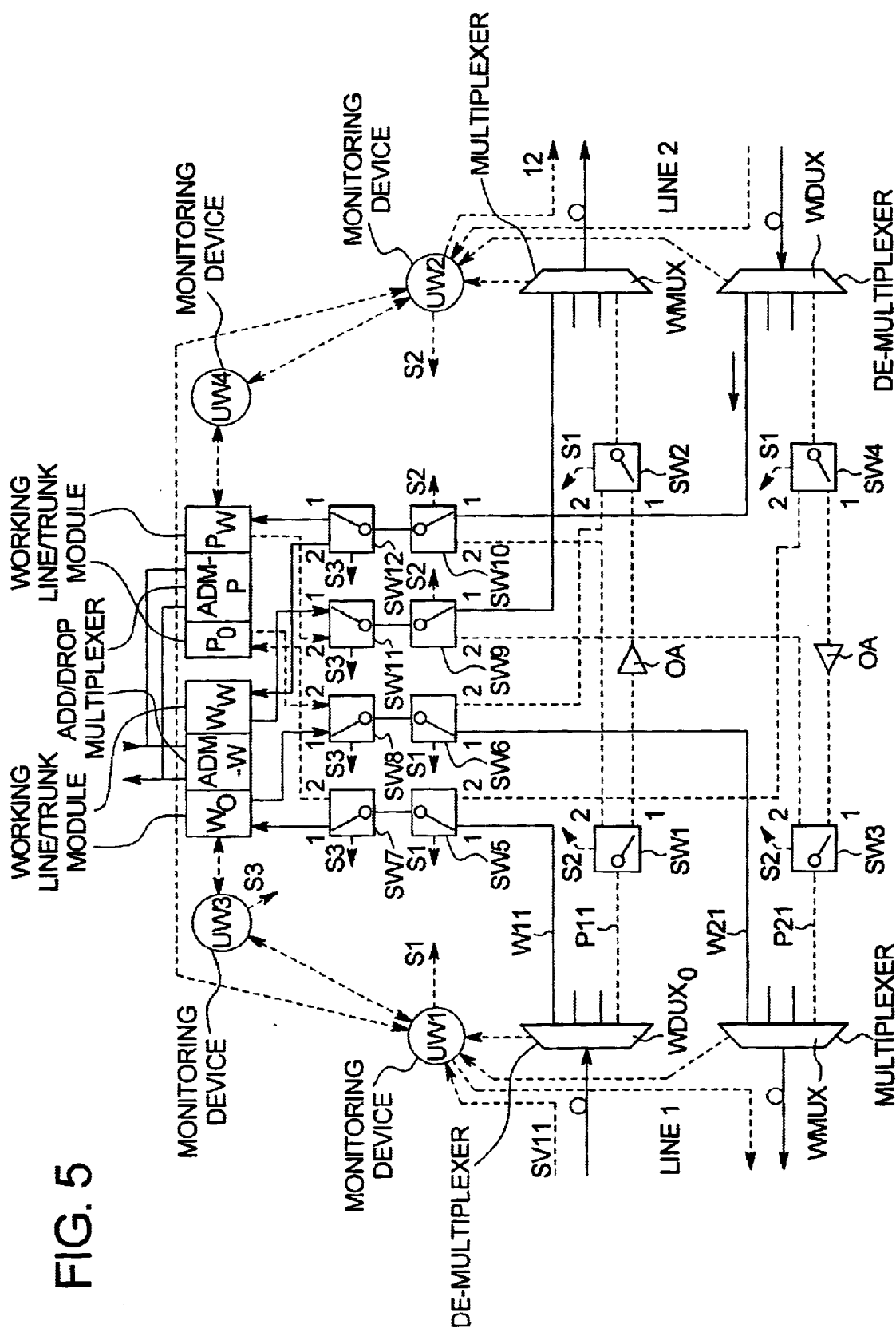
FIG. 5 illustrates a protection means with terminal protection.

A further version of the protection method is shown in FIG. 5. Here, the line/trunk module are not implemented in a redundant manner. Instead, however, the complete working multiplexer ADM-W, including the line/trunk modules $W_O$, $W_W$, is doubled. The monitoring device UW3 is allocated to the working multiplexer, this—given a malfunction of the actual multiplexer means or of its line/trunk modules switches to a protection multiplexer ADM-P with its line/trunk modules $P_O$, $P_W$. This switching ensues by actuation of the switches SW7, SW8, SW11 and SW12.

Given a line disturbance, switching onto the protection channels ensues via the switches SW5, SW6, SW9 and SW10 according to the above-described method. An additional monitoring circuit UW4 can be utilized for monitoring the protection multiplexer ADM-P when both multiplexers are to operate with the same priority.

It should also be added that, given a disturbance of a working channel in only one transmission direction (e.g. due to a fault in a regenerator) it suffices to connect an alternate route for only this connection that is disturbed at one side. The illustrated optical switches can be replaced by an optical cross connector.

While this invention has been described in connection with what is presently considered to be the most practical and preferred embodiments, it is to be understood that the invention is not limited to the disclosed embodiments but, on the contrary, is intended to cover various modifications and equivalent arrangements included within the spirit and scope of the appended claims.

What is claimed is:

1. A method for data transmission in a bi-directional working channel between a plurality of terminals of an optical ring network that enables a protection connection, when a disturbance of the data transmission occurs, via undisturbed sections of the optical ring network for a wavelength-division multiplex method executed in the working channel, wherein a single bi-directional protection channel comprised of a predetermined wavelength range and at least a transmission capacity of the working channel connects all of the plurality of terminals to one another, the method comprising:

detecting whether a malfunction of a working line/trunk assembly of the two neighboring terminals has occurred;

switching data transmission to an allocated protection line/trunk module when a malfunction is detected such that connection via the working channel is maintained; and detecting whether a disturbance in a line section between two neighboring terminals of the plurality of terminals has occurred; and establishing a protection connection in the bi-directional protection channel between the two neighboring terminals via undisturbed sections of the optical ring network when disturbance of the line section is detected wherein the protection channel is looped through unaffected terminals of the plurality of terminals.

2. The method according to claim 1, wherein the protection channel is looped through all of the plurality of terminals when there is undisturbed operation of the optical ring.

3. The method according to claim 1, wherein a plurality of individual channels having respective different wavelengths are transmitted in the working channel and in the protection channel.

4. The method according to claim 1, wherein a first plurality of individual channels having respective different wavelengths are transmitted between more than two of the plurality of terminals with more than one ADD/DROP multiplexer in the working channel; and wherein a second plurality of individual channels having respective different wavelengths corresponding to the first plurality of individuals channels are transmitted in the protection channel.

5. The method according to claim 1, wherein when a disturbance occurs in at least one of a working multiplexer and line/trunk modules allocated to the working multiplexer data transmission is switched to an alternative protection multiplexer and line/trunk modules allocated to the protection multiplexer.

6. The method according to claim 1, wherein data transmission is accomplished via two separate optical fibers.

7. An apparatus for data transmission between a plurality of terminals in an optical ring network that provides protection when data transmission is disturbed by enabling a protection connection using wavelength-division multiplexing in a protection channel via undisturbed sections of the optical ring network comprising:

a plurality of wavelength-division demultiplexers each configured to decouple individual working signals and protection signals multiplexed together;

a plurality of wavelength-division multiplexers each configured to couple individual working signals and protections signals by multiplexing the signals together, wherein a single bi-directional channel comprised of a predetermined wavelength range and having at least the transmission capacity of the working channels is created to connect all of the plurality of terminals to one another;

a corresponding working module and protection line/trunk module for each transmission direction that is provided in each of the plurality of terminals; and a plurality of optical switches disposed between outputs of the wavelength-division demultiplexers and inputs of the wavelength-division multiplexers, the plurality of optical switches configured for looping the protection channel through the plurality of terminals when there are disturbed connections and for switching onto an allocated protection module and producing a protection connection with the bi-directional protection channel via undisturbed sections of the optical ring network when there are disturbed connections.

8. A method for data transmission between a plurality of terminals in an optical ring network that provides protection when data transmission over a working connection is disturbed by enabling a protection connection in a single bi-directional protection channel using wavelength-division multiplexing via an undisturbed line/trunk module and an undisturbed section of the optical ring, wherein the single bi-directional protection channel comprises a predetermined wavelength and at least the capacity of the working channel and connects all the terminals to each other, the method comprising:

demultiplexing received individual working signals and protection signals;

multiplexing individual working signals and protection signals to be transmitted;

monitoring and detecting in at least one of the plurality of terminals whether at least one of a malfunction of a working line/trunk module or a disturbance of a line section between two neighboring terminals has occurred;

switching to an associated protection line/trunk module when a working line/trunk module malfunction is detected; and switching neighboring terminals to an undisturbed section of the optical ring network when a disturbed working connection is detected and receiving and transmitting data via the protection channel.

9. The method according to claim 8, wherein the protection channel is looped through all of the plurality of terminals when there is undisturbed operation of the optical ring.

10. The method according to claim 8, wherein a plurality of individual channels having respective different wavelengths are transmitted in the working channels and in the protection channel.

11. The method according to claim 8, wherein a first plurality of individual channels having respective different wavelengths are transmitted between more than two of the plurality of terminals with more than one ADD/DROP multiplexer in the working channel; and wherein a second plurality of individual channels having respective different wavelengths corresponding to the first plurality of individual channels are transmitted in the protection channel.

12. The method according to claim 8, wherein when a disturbance occurs in at least one of a working multiplexer and line/trunk modules allocated to the working multiplexer data transmission is switched to an alternative protection multiplexer and link/trunk modules allocated to the protection multiplexer.

13. The method according to claim 8, wherein data transmission is accomplished via two separate optical fibers.

14. An apparatus for data transmission between a plurality of terminals in an optical ring network that provides protection when data transmission over a working connection is disturbed by enabling a protection connection in a single bi-directional protection channel using wavelength-division multiplexing via an undisturbed line/trunk module and an undisturbed section of the optical ring, wherein the single bi-directional protection channel comprises a predetermined wavelength and at least the capacity of the working channel and connects all the terminals to each other, each terminal comprising:

a plurality of wavelength-division demultiplexers, each demultiplexer configured to decouple received individual working signals and protection signals being multiplexed together;

a plurality of wavelength-division multiplexers, each multiplexer configured to couple individual working signals and protection signals by multiplexing the signals together and to transmit said signals;

at least one working line/trunk module and a corresponding associated protection line/trunk module for each transmission direction, each pair of a working line/trunk module and a corresponding associated protection line/trunk module having associated switches to connect the working line/trunk module or the associated protection line/trunk module with outputs of a multiplexer of the plurality and inputs of a demultiplexer of the plurality, respectively; and monitoring devices for monitoring the line/trunk modules and the working connections and for controlling the switches to switch data transmission and data reception from the working line/trunk module to the associated protection line/trunk module when the working line/trunk module malfunctions, and to switch from the working connection to the bi-directional protection channel when disturbed working connections occur.

15. An apparatus according to claim 14, each of the terminals further comprising additional switches directly connected to the multiplexer and the demultiplexer, respectively, and between the multiplexer and the demultiplexer, respectively, and the associated switches to connect a received signal from an output of the demultiplexer with a line/trunk module and to connect a signal to be transmitted with an input of the multiplexer when the received signal is dropped and a new signal is transmitted, or to connect the output of the demultiplexer to an input of the multiplexer when the signal is put through the terminal.

* * * * *